US011243950B2

(12) United States Patent
Chen

(10) Patent No.: US 11,243,950 B2
(45) Date of Patent: Feb. 8, 2022

(54) DATABASE QUERY PLAN SELECTION

(71) Applicant: Beijing OceanBase Technology Co., Ltd., Beijing (CN)

(72) Inventor: Mengmeng Chen, Hangzhou (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 17/391,882

(22) Filed: Aug. 2, 2021

(65) Prior Publication Data

US 2021/0365454 A1 Nov. 25, 2021

Related U.S. Application Data

(63) Continuation of application No. 16/888,526, filed on May 29, 2020, now Pat. No. 11,080,278, which is a (Continued)

(30) Foreign Application Priority Data

May 31, 2018 (CN) .......................... 201810551049.4

(51) Int. Cl.
G06F 16/2453 (2019.01)
G06F 16/22 (2019.01)
(Continued)

(52) U.S. Cl.
CPC .... G06F 16/24542 (2019.01); G06F 16/2282 (2019.01); G06F 16/24524 (2019.01); G06F 16/24539 (2019.01); G06K 9/6215 (2013.01)

(58) Field of Classification Search
None
See application file for complete search history.

(56) References Cited

U.S. PATENT DOCUMENTS 6,985,904 B1 1/2006 Kaluskar et al.
10,628,417 B2 * 4/2020 McKenna ......... G06F 16/24542
(Continued)

FOREIGN PATENT DOCUMENTS

CN 105224690 1/2016
CN 105718593 6/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Christopher J Raab
(74) *Attorney, Agent, or Firm* — Fish & Richardson P.C.

(57) ABSTRACT

A computer-implemented database access method includes receiving, by a server, a database access statement including a target identifying parameter; parsing the database access statement to determine the target identifying parameter; determining a statement type of the database access statement; obtaining a pre-stored execution plan group corresponding to the statement type, the pre-stored execution plan group including one or more execution plans for accessing a database corresponding to the database access statement, in which each execution plan corresponds to a different respective identifying parameter; selecting a target execution plan from the pre-stored execution plan group based on the target identifying parameter; and executing the target execution plan.

20 Claims, 6 Drawing Sheets

Related U.S. Application Data continuation of application No. PCT/CN2019/076971, filed on Mar. 5, 2019.

(51) Int. Cl.
*G06F 16/2452* (2019.01)
*G06K 9/62* (2006.01)

(56) References Cited

U.S. PATENT DOCUMENTS

| | | | |
|---|---|---|---|
| 2007/0040328 A1* | 2/2007 | Hattori | G03G 15/50 |
| | | | 271/293 |
| 2007/0050328 A1 | 3/2007 | Li | |
| 2008/0195577 A1* | 8/2008 | Fan | G06F 16/24545 |
| 2008/0215531 A1 | 9/2008 | Markl et al. | |
| 2009/0106219 A1 | 4/2009 | Belknap | |
| 2010/0082507 A1 | 4/2010 | Ganapathi | |
| 2011/0153594 A1 | 6/2011 | Hagenbuch | |
| 2011/0282851 A1 | 11/2011 | Sivashannnugann | |
| 2012/0005189 A1 | 1/2012 | Yu | |
| 2013/0173528 A1 | 7/2013 | Betawadkar-Norwood | |
| 2013/0318069 A1* | 11/2013 | Alu | G06F 16/24524 |
| | | | 707/718 |
| 2014/0046928 A1* | 2/2014 | Konik | G06F 16/24542 |
| | | | 707/718 |
| 2014/0229464 A1 | 8/2014 | Milenova et al. | |
| 2014/0258264 A1 | 9/2014 | Bestgen | |
| 2015/0032703 A1 | 1/2015 | Sivashanmugam et al. | |
| 2017/0046386 A1 | 2/2017 | Kirk et al. | |
| 2017/0357692 A1 | 12/2017 | Su et al. | |
| 2018/0113904 A1 | 4/2018 | Brodt | |
| 2018/0173712 A1* | 6/2018 | Sharma | G06F 16/24542 |
| 2020/0293533 A1 | 9/2020 | Chen | |

FOREIGN PATENT DOCUMENTS

| | | |
|---|---|---|
| CN | 106407246 | 2/2017 |
| CN | 106897343 | 6/2017 |
| CN | 107451203 | 12/2017 |
| CN | 107798017 | 3/2018 |
| CN | 108027763 | 5/2018 |
| CN | 108763536 | 11/2018 |
| EP | 1587012 A2 | 10/2005 |
| TW | 200919235 | 5/2009 |
| TW | 201327235 | 7/2013 |
| TW | 201445267 | 12/2014 |
| TW | 201621715 | 6/2016 |

OTHER PUBLICATIONS

Extended European Search Report in Application No. 19812032.1, dated Oct. 14, 2020, 10 pages.

Jin, "Study on the optimization rules of SQL statement based on Oracle database", China's outstanding master's degree thesis full text database information technology series, May 30, 2015, 59 pages (with English abstract).

Nakamoto, "Bitcoin: A Peer-to-Peer Electronic Cash System," www.bitcoin.org, 2005, 9 pages.

PCT International Search Report and Written Opinion in International Application No. PCT/CN2019/076971, dated May 29, 2019, 10 pages (with partial English translation).

PCT International Preliminary Report on Patentability in International Application No. PCT/CN2019/076971, dated Dec. 1, 2020, 10 pages.

Extended European Search Report in European Appln No. 21185187.8, dated Nov. 5, 2021, 13 pages.

* cited by examiner

DATABASE QUERY PLAN SELECTION

CROSS-REFERENCE TO RELATED APPLICATIONS

This application is a continuation of and claims the benefit of priority of U.S. patent application Ser. No. 16/888,526, filed May 29, 2020, which is a continuation of PCT Application No. PCT/CN2019/076971, filed on Mar. 5, 2019, which claims priority to Chinese Patent Application No. 201810551049.4, filed on May 31, 2018, and each application is hereby incorporated by reference in its entirety.

TECHNICAL FIELD

One or more implementations of the present specification relate to the field of computer technologies, and in particular, to database access methods and apparatuses.

BACKGROUND

To respond to a user's database access request, after receiving the user's database access request, a server usually formulates a corresponding access policy and solution for the access request. The access policy and solution here can be referred to as an execution plan. Then, the server executes the formulated execution plan to access the database, and returns a desired result to the user.

It is worthwhile to note that, in ideal situations, a corresponding execution plan can be formulated for each access request. However, in the process of formulating an execution plan, cumbersome operations such as statistics calculation and sampling usually need to be performed on data in the database. In other words, the formulation process is time-consuming, usually causing the user's access time to be excessively long.

SUMMARY

One or more implementations of the present specification describe database access methods and apparatuses, to improve efficiency and accuracy of a user's access to a database.

According to a first aspect, a database access method is provided, including the following: receiving a database access statement; parsing the database access statement to determine a target user parameter included in the database access statement; determining a statement type of the database access statement; obtaining a pre-stored execution plan group corresponding to the database access statement of the statement type, where execution plans in the execution plan group are distinguished by using different user parameters; selecting a target execution plan from the execution plan group based on the target user parameter; and executing the target execution plan.

According to a second aspect, a database access apparatus is provided, including the following: a receiving unit, configured to receive a database access statement; a parsing unit, configured to parse the database access statement received by the receiving unit, to determine a target user parameter included in the database access statement; a determining unit, configured to determine a statement type of the database access statement; an acquisition unit, configured to obtain a pre-stored execution plan group corresponding to the database access statement of the statement type determined by the determining unit, where execution plans in the execution plan group are distinguished by using different user parameters; a selection unit, configured to select a target execution plan from the execution plan group obtained by the acquisition unit, based on the target user parameter; and an execution unit, configured to execute the target execution plan selected by the selection unit.

One or more implementations of the present specification provide database access methods and apparatuses. The database access methods and apparatuses include the following: receiving a database access statement; parsing the database access statement to determine a target user parameter included in the database access statement; determining a statement type of the database access statement; obtaining a pre-stored execution plan group corresponding to the database access statement of the statement type; selecting a target execution plan from the obtained execution plan group based on the target user parameter; and executing the target execution plan. In other words, in the implementations of the present specification, database access statements of the same statement type share one execution plan group, and execution plans in the same execution plan group are distinguished by using different user parameters, thus improving accuracy of a user's access to a database. In addition, the quantity of formulated execution plans can be significantly reduced. When the quantity of execution plans is reduced, efficiency of the user's access to the database can be improved, and computer resources can be reduced.

BRIEF DESCRIPTION OF DRAWINGS

To describe the technical solutions in the implementations of the present specification more clearly, the following briefly describes the accompanying drawings needed for describing the implementations. Clearly, the accompanying drawings in the following description show merely some implementations of the present specification, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
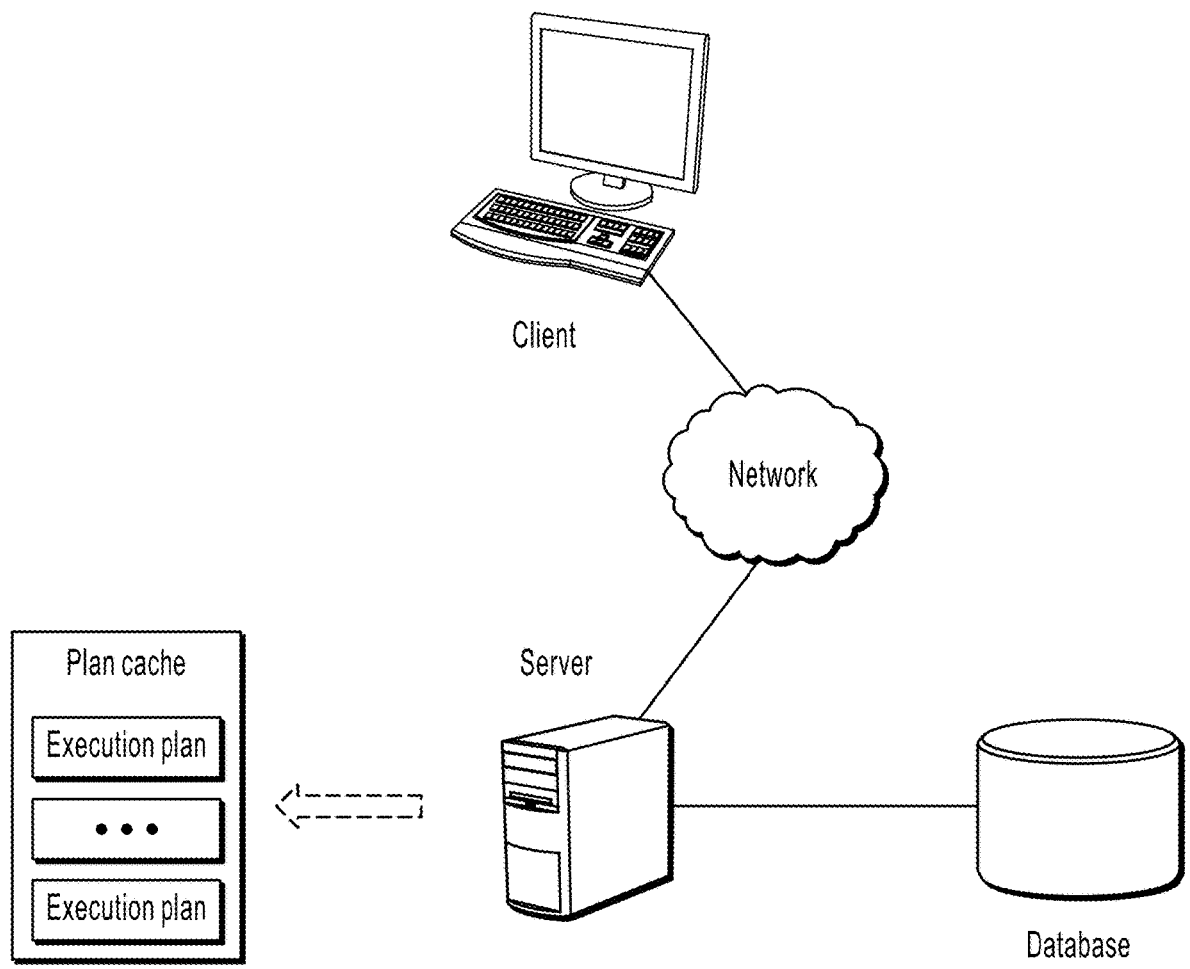
FIG. 1 is a schematic diagram illustrating an application scenario of a database access method, according to the present specification.

Database access methods provided in the present specification can be applied to a scenario shown in FIG. 1. In FIG. 1, a client can send a database access request to a server. The database access request can be implemented by using a database access statement (such as Structured Query Language (SQL)). The server in FIG. 1 can include a plan cache. The plan cache can be storage space obtained by dividing a memory of the server, and is used to store an execution plan generated by the server. The execution plan here can be generated by the server based on the previously described database access statement. In addition, the server can access the database. The server accesses the database by executing an execution plan.

The database in FIG. 1 can include multiple objects. The object can be an access entity that may exist in a database access statement, such as a table, a view, etc. In the present specification, for example, the object is a table.

Figure 2:
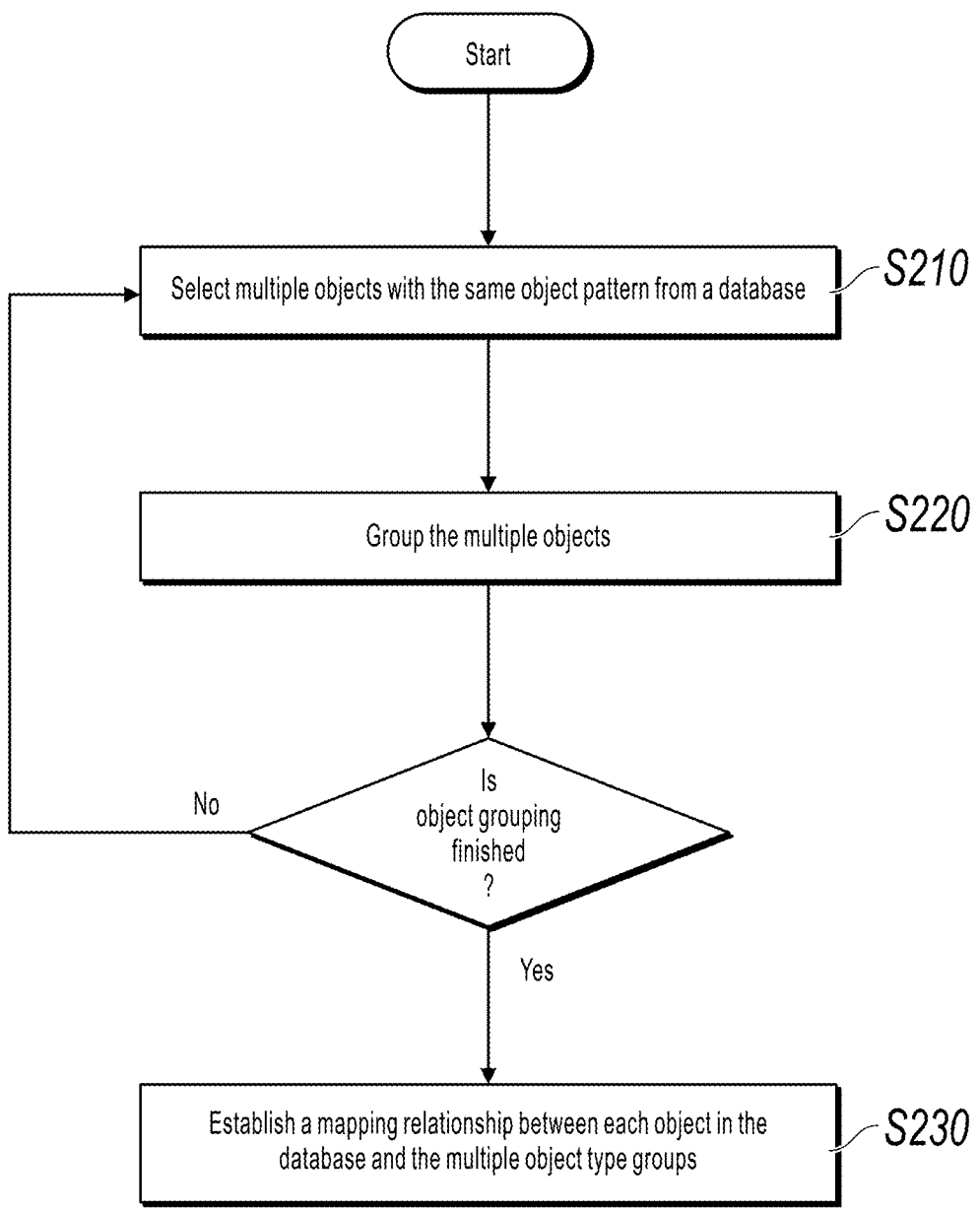
FIG. 2 is a flowchart illustrating a method for determining an object type group, according to the present specification.

It is worthwhile to note that, before the database access method provided in the present specification is performed, the objects in the database can be grouped to determine multiple object type groups. In some implementations, a method for determining the multiple object type groups can be shown in FIG. 2. In FIG. 2, the determining method can include the following:

Step S210: Select multiple objects with the same object pattern from a database.

A table is used as an example for description. The multiple objects with the same object pattern can be multiple tables having the same column data type and the same index pattern. The same index pattern can mean that the quantity of indexes created for multiple tables are the same, and the columns for which indexes are created are the same.

For example, for two tables user_01 and user_02 created by using the following SQL statements, it is considered that the two tables have the same object pattern.

create table user_01 (id integer primary key, gmt_create date, balance_01 number(10,2) index user_01_gmt_balance on (gmt_create, balance_01));

create table user_02 (id integer primary key, gmt_create date, balance_02 number(10,2) index user_02_gmt_balance on (gmt_create,balance_02));

It can be understood from the previous SQL statements that user_01 includes three columns in total, and the data types of the three columns are "integer", "date", and "number (10,2)" respectively. In addition, an index is created for user_01, and a column for which the index is created is column 3. Similarly, it can be understood that user_02 includes three columns in total, and the data types of the three columns are "integer", "date", and "number (10,2)" respectively. In addition, an index is created for user_02, and a column for which the index is created is column 3. Therefore, it can be considered that user_01 and user_02 are two tables having the same object pattern.

Step S220: Group the multiple objects.

It is worthwhile to note that, in the present specification, the grouping of objects is a progressive process. For example, for the multiple objects selected in step S210, any two objects can be first grouped, that is, a similarity between the two objects is calculated. When the calculated similarity is less than a predetermined threshold d, the two objects are categorized into one group. When the calculated similarity is not less than a predetermined threshold d, the two objects are categorized into two groups. Then, a third object of the multiple objects is grouped. For example, when the previously described two objects are categorized into one group, a similarity between the third object and one of the two objects can be calculated. When the calculated similarity is less than the predetermined threshold d, the third object is also categorized into the previous one group. If the calculated similarity is not less than the predetermined threshold d, a similarity between the third object and the other object is calculated. If the calculated similarity is less than the predetermined threshold d, the third object is also categorized into the previous one group. Otherwise, the third object is categorized into another group.

When the previously described two objects are categorized into two groups, a similarity between the third object and one of the two objects can be calculated. If the calculated similarity is less than the predetermined threshold d, the third object is categorized into the group in which the one object is located. If the calculated similarity is not less than the predetermined threshold d, a similarity between the third object and the other object is calculated. If the calculated similarity is less than the predetermined threshold d, the third object is categorized into the group in which the other object is located. Otherwise, the third object is categorized into another group. By analogy, the process is repeated until the previously described multiple objects are all categorized into corresponding groups.

In summary, the object grouping method provided in the present specification is performed in turn for each object. To be specific, when an object is to be grouped, the object can be successively compared with multiple objects in multiple existing groups in terms of similarity (i.e., the similarity is calculated). When a similarity between the object and a certain object in any group satisfies a need, the comparison is stopped, and the object is categorized into the group. Otherwise, the comparison continues. If no object "is similar to" the object in the end (i.e., the similarity is less than the predetermined threshold d), the object is categorized into a separate group, and then the similarity comparison process continues for the other objects.

In some implementations, the similarity can be determined by calculating the Euclidean distance between two objects. For example, the similarity between two tables is calculated. Three attributes can be predetermined: the quantity of rows r, the quantity of unique values ndv, and an average row length rl. Then, when the similarity between any two tables is to be calculated, attribute values of the previously described three attributes of the two tables can be first determined. Finally, the similarity between the two tables is calculated based on the attribute values of the three attributes of the two tables. For example, a formula for calculating the similarity between any two tables can be as follows:

$$\text{similariry} = \sqrt{(r_1-r_2)^2+(ndv_1-ndv_2)^2+(rl_1-rl_2)^2} \quad \text{(Formula 1)}$$

In the formula, similarity represents the similarity between the two tables; $r_1$, $ndv_1$ and $rl_1$ represent the quantity of rows, the quantity of unique values and the average row length of one table, respectively; $r_2$, $ndv_2$ and $rl_2$ represent the quantity of rows, the quantity of unique values and the average row length of the other table, respectively.

Certainly, in practice, other attributes such as the quantity of columns can also be defined, which is not limited in the present specification.

It can be understood that, step S210 and step S220 can be repeated until each object in the database is categorized into a corresponding group. After each object in the database is categorized into a corresponding group, the groups obtained by categorization can be used as multiple object type groups.

Step S230: Establish a mapping relationship between each object in the database and the multiple object type groups.

For example, the previously described mapping relationship can be shown in Table 1.

TABLE 1

| Object | Object type group |
|---|---|
| user_01 | group_01 |
| user_02 | group_01 |

TABLE 1-continued

| Object | Object type group |
|---|---|
| dept_01 | group_02 |
| ... | ... |

In Table 1, user_01 and user_02 belong to the same object type group (group_01). In other words, object patterns of user_01 and user_02 are the same and a similarity between user_01 and user_02 is less than a predetermined threshold d.

In the present specification, objects having the same object pattern and having a similarity less than the predetermined threshold d are categorized into the same object type group. As such, in the case of database division and table division, multiple physical sub-tables of the same logical table can be aggregated, thus significantly reducing the quantity of generated execution plans, and reducing computer resources.

It is worthwhile to note that, for the previously described multiple object type groups, it can be periodically and automatically detected whether object patterns of objects in each object type group are the same. When the object patterns are the same, for each object, similarities between the object and other objects in the object type group are calculated. When none of the similarities between the object and other objects is less than a predetermined threshold, an object type group that the object belongs to is re-determined. Thus, accuracy of each object group in the database is ensured, and accuracy of database access can be further improved. In addition, the process of automatically detecting accuracy of an object group can reduce dependence on a user and intrusion, thus increasing stability of a database system.

It is worthwhile to further note that, the policy of determining the object type group based on the object pattern and the similarity in the present specification can alleviate the problem of poor stability and usability of the database caused by designating the object type group by the user.

It can be understood that, the database access method provided in the present specification can be performed after the objects in the database are categorized into corresponding object type groups.

Figure 3:
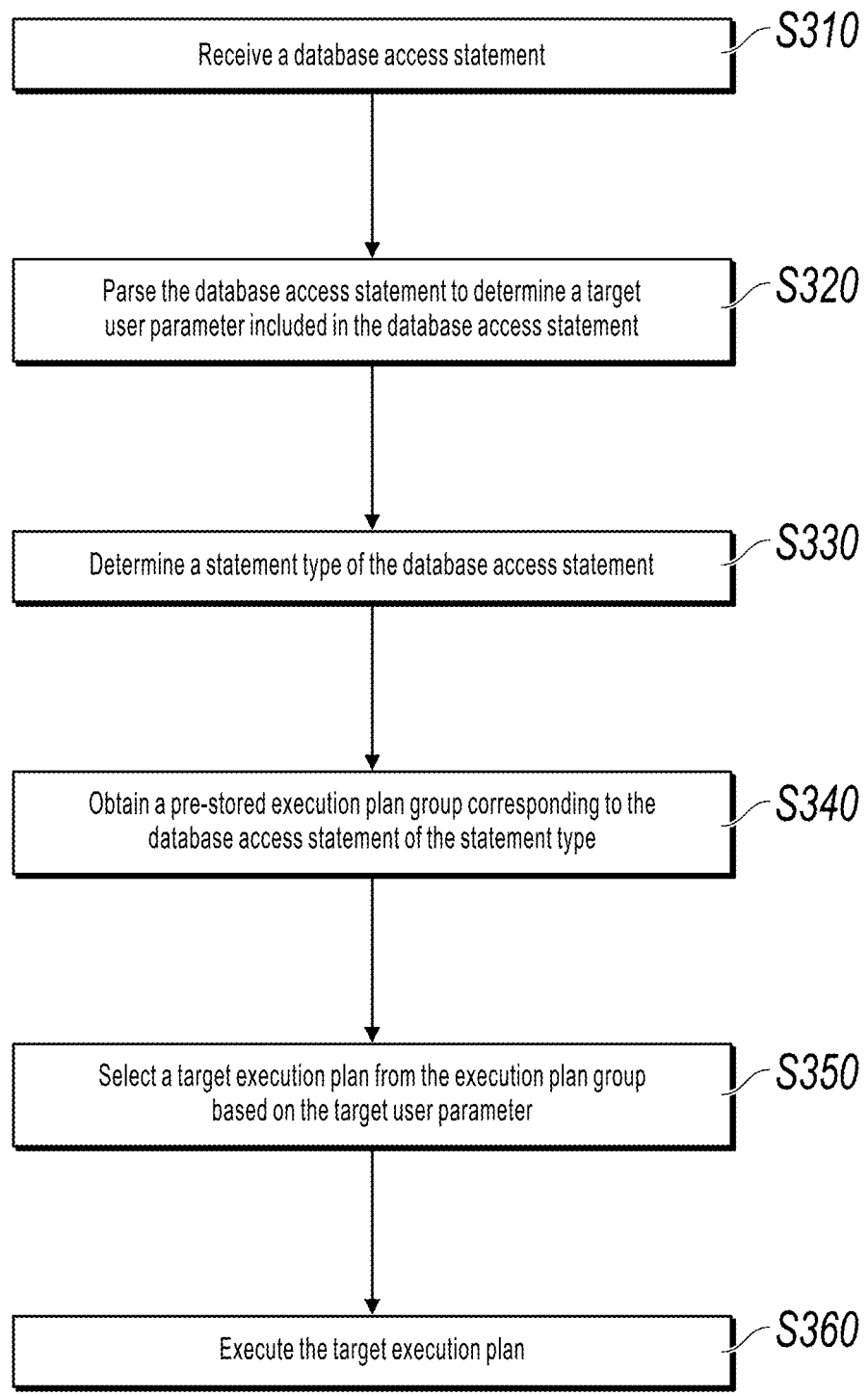
FIG. 3 is a flowchart illustrating a database access method, according to an implementation of the present specification.

FIG. 3 is a flowchart illustrating a database access method, according to an implementation of the present specification. The method can be performed by a device having a processing capability, i.e., a server, a system, or an apparatus, such as a server in FIG. 1. As shown in FIG. 3, the method can include the following:

Step S310: Receive a database access statement.

Here, the database access statement sent by a client can be received by a server. The database access statement can be an SQL statement. For example, the database access statement can be as follows: select * from user_01 a, dept_01 b where a.id=b.id and a.id=1.

Step S320: Parse the database access statement to determine a target user parameter included in the database access statement.

When the database access statement is an SQL statement, the SQL statement can be parsed based on a syntax of the SQL statement. The previously described target user parameter can be a fixed value in the SQL statement. The target user parameter can include an integer, a floating-point number, a string, etc.

In the previous example, the target user parameter included in the SQL statement is 1.

Step S330: Determine a statement type of the database access statement.

In some implementations, the database access statement can be first parameterized. Then, the statement type is determined based on the parameterized database access statement. The step of parameterizing the database access statement can include the following:

Step a: Extract a corresponding object set from the database access statement.

An object in the object set can be an access entity that may exist in the database access statement, such as a table, a view, etc. When the database access statement is an SQL statement, the SQL statement can be parsed based on a syntax of the SQL statement to extract the previously described object set.

For example, the database access statement is as follows: select * from user_01 a, dept_01 b where a.id=b.id and a.id=1. The extracted object set can be as follows: 0={user_01,dept_01}.

Step b: For an object in the object set, determine an object type group that the object belongs to, and obtain a corresponding group name.

When multiple object type groups are predetermined, and a mapping relationship between each object in the database and multiple object type groups is established, the object type group that the object in the object set belongs to can be determined based on the mapping relationship. In the previous example, based on the content shown in Table 1, the object type group that user_01 belongs to can be determined as group_01, and the object type group that dept_01 belongs to can be determined as group_02.

Step c: Replace the object in the database access statement with the corresponding group name, and replace the target user parameter with a wildcard.

The wildcard here can refer to any one or more characters that are different from other characters or strings in the database access statement. The character can be a special character such as "@", "?", or "%". For example, the wildcard is "?". In the previous example, user_01 is replaced with group_01, dept_01 is replaced with group_02, and 1 is replaced with "?". Then the SQL statement is converted into the following string: select * from group_01, group_02 where group_01.id=group_02.id and group_01.id=?.

It can be understood that, the previously described string is a statement type of the database access statement.

Step S340: Obtain a pre-stored execution plan group corresponding to the database access statement of the statement type.

In some implementations, the execution plan group can be obtained from a plan cache of the server. The plan cache can pre-store multiple execution plan groups corresponding to different statement types. Each execution plan group is identified by using a corresponding hash value, and execution plans in the execution plan group are distinguished by using different user parameters.

For example, content of the plan cache can be shown in Table 2.

TABLE 2

| Hash value | Statement type | Execution plan group | | |
|---|---|---|---|---|
| XXXX | select * from group_01, group_02 where group_01.id = group_02.id and group_01.id = ? | Group 1 | plan1<br>plan2<br>plan3 | 1<br>2<br>3 |
| YYYY | select * from group_01, group_03 | Group 2 | plan4 | ≤10 |

TABLE 2-continued

| Hash value | Statement type | Execution plan group | | |
|---|---|---|---|---|
| | where group_01.id = group_03.id and group_01.id = ? | | plan5 | >10 |
| ZZZZ | select * from group_01, group_02 where group_01.id = group_02.id and group_01.age = ? | Group 3 | plan6 plan7 plan8 | ≤18 (18, 50) ≥50 |
| ... | ... | | ... | |

Certainly, in practice, the previously described plan cache does not have to include the statement type, or can further include other content, which is not limited in the present specification.

After the statement type of the database access statement is determined, a hash value corresponding to the statement type can be calculated based on a predetermined hash function. Then, the corresponding execution plan group is obtained based on the calculated hash value.

It is worthwhile to note that, the execution plan group in the plan cache can be continuously generated and stored by the server in response to a user's database access request. The process of generating the previously described execution plan group can also be referred to as a plan space exploration process. The plan space exploration process can be shown in FIG. 4.

Figure 4:
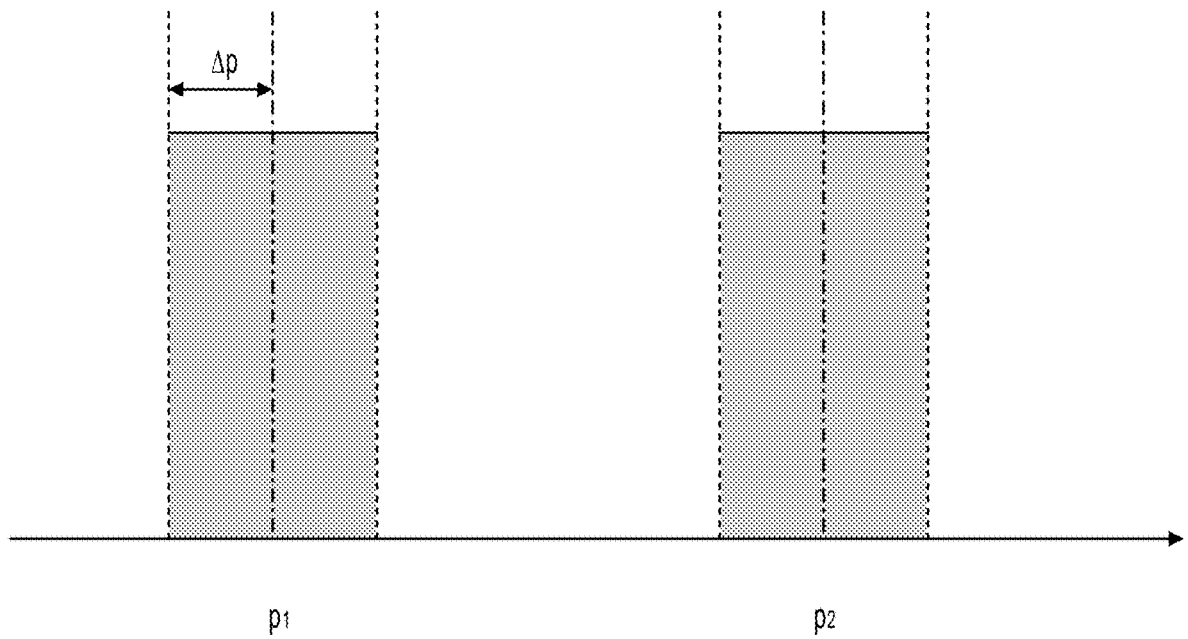
FIG. 4 is a schematic diagram illustrating a plan space exploration process, according to the present specification.

In FIG. 4, p1 and p2 are two different points in the parameter space, and are used to represent two different user parameters. When receiving a certain statement type of a database access statement that includes p1, the server can generate a corresponding execution plan based on p1. The process of generating the execution plan can be illustrated as dividing an area in the parameter space shown in FIG. 4, and the area obtained by division can also be referred to as a plan space. Then, when receiving the statement type of the database access statement that includes p2, the server can calculate a distance $\Delta p$ between p2 and p1 (for example, an Euclidean distance). Assuming that $\Delta p$ is greater than a distance threshold D, the corresponding execution plan can be generated based on p2, that is, another plan space is divided in the parameter space shown in FIG. 4. It is worthwhile to note that, a new execution plan is no longer generated when the distance $\Delta p$ between pi and p1 (or p2) is less than D, where pi is a user parameter included in the database access statement of the statement type that the server receives at one time. In other words, pi and p1 (or p2) share an execution plan. It can be understood that, as user parameters increase, the whole parameter space will be divided into multiple different plan spaces gradually. When some plan spaces overlap, two plan spaces are combined into one. Finally, the whole parameter space will be divided, and the plan space exploration process ends. It can be understood that, after the plan space exploration process ends, the multiple execution plans generated form one execution plan group.

Certainly, in practice, p1 and p2 can also be two different numerical ranges in the parameter space, which is omitted here for simplicity in the present specification.

It is worthwhile to note that, FIG. 4 shows only the plan space exploration process in a one-dimensional space. When the database access statement includes multiple different user parameters at the same time, such as n different user parameters, the parameter space forms an n-dimensional space. The plan space exploration process is similar in the n-dimensional space. For example, n different user parameters can be represented as an array (a1, a2, a3, ..., an). Then during division of the plan space, assume that a corresponding plan space has been divided for a certain point (b1, b2, b3, ..., bn) in the parameter space. Then a distance $\Delta p$ between the array and the point can be calculated based on the following formula.

$$\Delta p = \sqrt{(a_1-b_1)^2+(a_2-b_2)^2+(a_3-b_3)^2+...+(a_n-b_n)^2} \quad \text{(Formula 2)}$$

Then, whether a new plan space is divided can be determined based on a magnitude relationship between the distance threshold and the distance $\Delta p$ calculated based on formula 2. The determining method is the same as the previous description, and details are omitted here for simplicity.

It is worthwhile to further note that, FIG. 4 shows only the process of generating one execution plan group, that is, the database access statements received by the server have the same statement type. When receiving multiple different statement types of database access statements, the server can generate a corresponding execution plan group for each statement type. As such, multiple execution plan groups can be obtained. For details, references can be made to the content shown in Table 2.

In the present specification, the method for generating execution plan in the plan space exploration process can significantly improve the quality of the execution plan, thus further improving the efficiency of the user's access to the database. In addition, in the present specification, the method for generating the execution plan group for a type of database access statement can prevent a large amount of repeated calculations, thus increasing the speed and efficiency of generating the execution plan. In addition, the method can also significantly reduce the quantity of generated execution plans, thus reducing the occupation of space and reducing the computer resources.

Step S350: Select a target execution plan from the execution plan group based on the target user parameter.

Optionally, to improve the quality of the selected execution plan, before step S350 is performed, it can be determined again whether the object type group that each object in the object set belongs to has changed. Step S350 is performed only if there is no change.

The previously described determining process can be as follows: for each object in the object set, it is determined whether an object pattern of the object is the same as an object pattern of each object in the object type group that the object belongs to. If the object patterns are the same, a similarity between the object and each object is successively calculated. For example, assume that the object set is {user_01, dept_01}, and a predetermined mapping relationship between an object in the database and an object type group is shown in Table 1. Then, it can be determined whether object patterns of user_01 and user_02 are the same. If the object patterns are the same, a similarity between the two objects can be calculated. In addition, it can be further determined whether object patterns of dept_01 and other objects in group_02 are the same. If the object patterns are the same, similarities between dept_01 and other objects in group_02 can be successively calculated. For the calculation of the similarity, references can be made to formula 1, and details are omitted here for simplicity. When a similarity between each object and any object in the object type group that each object belongs to is less than a predetermined threshold, it is considered that the object type group that each object belongs to has not changed. It is worthwhile to note that, when the object patterns are different, or when the object patterns are the same but none of the similarities between the object and other objects in the object type group is less than the predetermined threshold, the object type group can be re-determined. In the previous example, assume that the object patterns of user_01 and user_02 are different, or that the object patterns are the same, but the similarity between them is not less than the predetermined threshold, and that the object patterns of dept_01 and other objects in group_02 are the same and the similarity between dept_01 and a certain object in the group is less than the predetermined threshold. In such case, the object type group that user_01 belongs to can be re-determined.

It can be understood that, when the object type group that a certain object or some objects belong to are re-determined, step S330 and step S340 can be performed again.

It is worthwhile to note that, for the execution plan group in step S350, when the previously described plan space exploration is finished, the execution plan group includes all the execution plans. As such, the corresponding target execution plan can be selected based on the target user parameter. In other words, an Euclidean distance between the target user parameter and a user parameter corresponding to each execution plan in the execution plan group is calculated. When an Euclidean distance between the target user parameter and a user parameter corresponding to any execution plan is less than a distance threshold, the any execution plan is used as the target execution plan.

When the previously described plan space exploration has not been finished, the process of selecting the target execution plan is the same as the previous description. The difference is that because the plan space exploration has not been finished, the target execution plan may not be selected. In other words, there may be a case in which none of Euclidean distances between the target user parameter and user parameters corresponding to various generated execution plans in the execution plan group is less than a distance threshold. In such case, the previously described plan space exploration process can continue. In other words, a corresponding plan space is divided in the parameter space shown in FIG. 4, that is, a new execution plan is generated based on the target user parameter. As such, the new execution plan is added to the execution plan group.

Step 360: Execute the target execution plan.

Here, if a target execution plan is selected, the target execution plan is executed. If no target execution plan is selected, the new execution plan is executed.

In summary, the solution provided in the implementations of the present specification can improve accuracy of the user's access to the database, and improve access efficiency.

Figure 5:
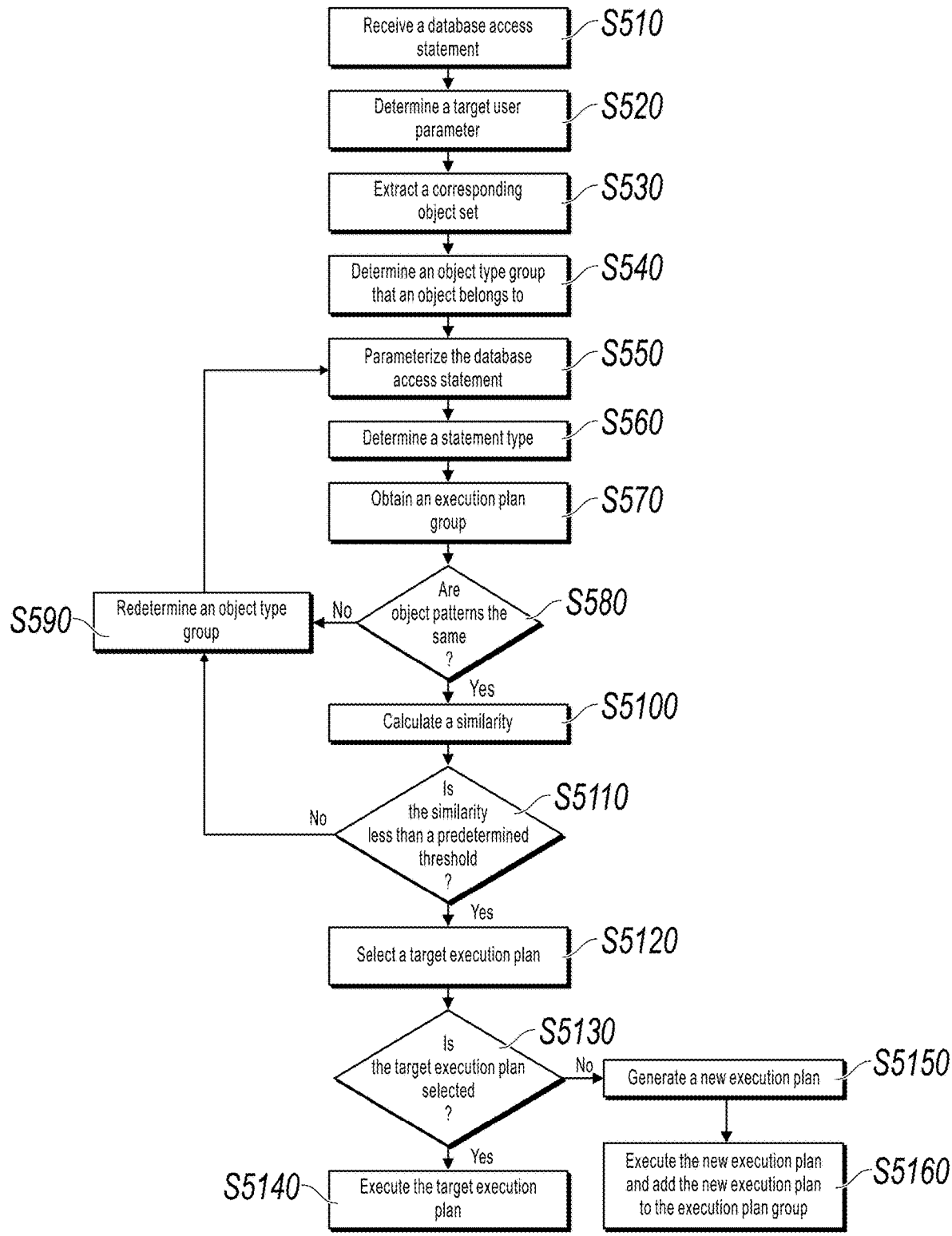
FIG. 5 is a flowchart illustrating a database access method, according to another implementation of the present specification.

FIG. 5 is a flowchart illustrating a database access method, according to another implementation of the present specification. As shown in FIG. 5, the method can include the following:

Step S510: Receive a database access statement.

Step S520: Parse the database access statement to determine a target user parameter included in the database access statement.

Step S530: Extract a corresponding object set from the database access statement.

Step S540: For an object in the object set, determine an object type group that the object belongs to.

Step S550: Parameterize the database access statement based on the determined object type group.

Step S560: Determine the statement type of the database access statement based on the parameterized database access statement.

Step S570: Obtain a pre-stored execution plan group corresponding to the database access statement of the statement type.

Step S580: For the object in the object set, determine whether an object pattern of the object is the same as an object pattern of each object in the object type group that the object belongs to. If no, step S590 is performed. If yes, step S5100 is performed.

Step S590: Re-determine the object type group that the object belongs to, and return to step S550.

Step S5100: Successively calculate a similarity between the object and each object.

Step S5110: Determine whether a similarity between the object and any object is less than a predetermined threshold. If no, step S590 is performed. If yes, step S5120 is performed.

Step S5120: Select a target execution plan from the execution plan group based on the target user parameter.

Step S5130: Determine whether the target execution plan is selected. If yes, step S5140 is performed. If no, step S5150 is performed.

Step S5140: Execute the target execution plan.

Step S5150: Generate a new execution plan based on the target user parameter.

Step S5160: Execute the new execution plan and add the new execution plan to the execution plan group.

In the previously described implementations of the present specification, the object type group that the object in the database access statement belongs to is first determined, and then the execution plan is selected or generated, so as to aggregate multiple objects of the same object type (for example, aggregate multiple physical sub-tables of the same logical table), thus sharing the execution plan.

Figure 6:
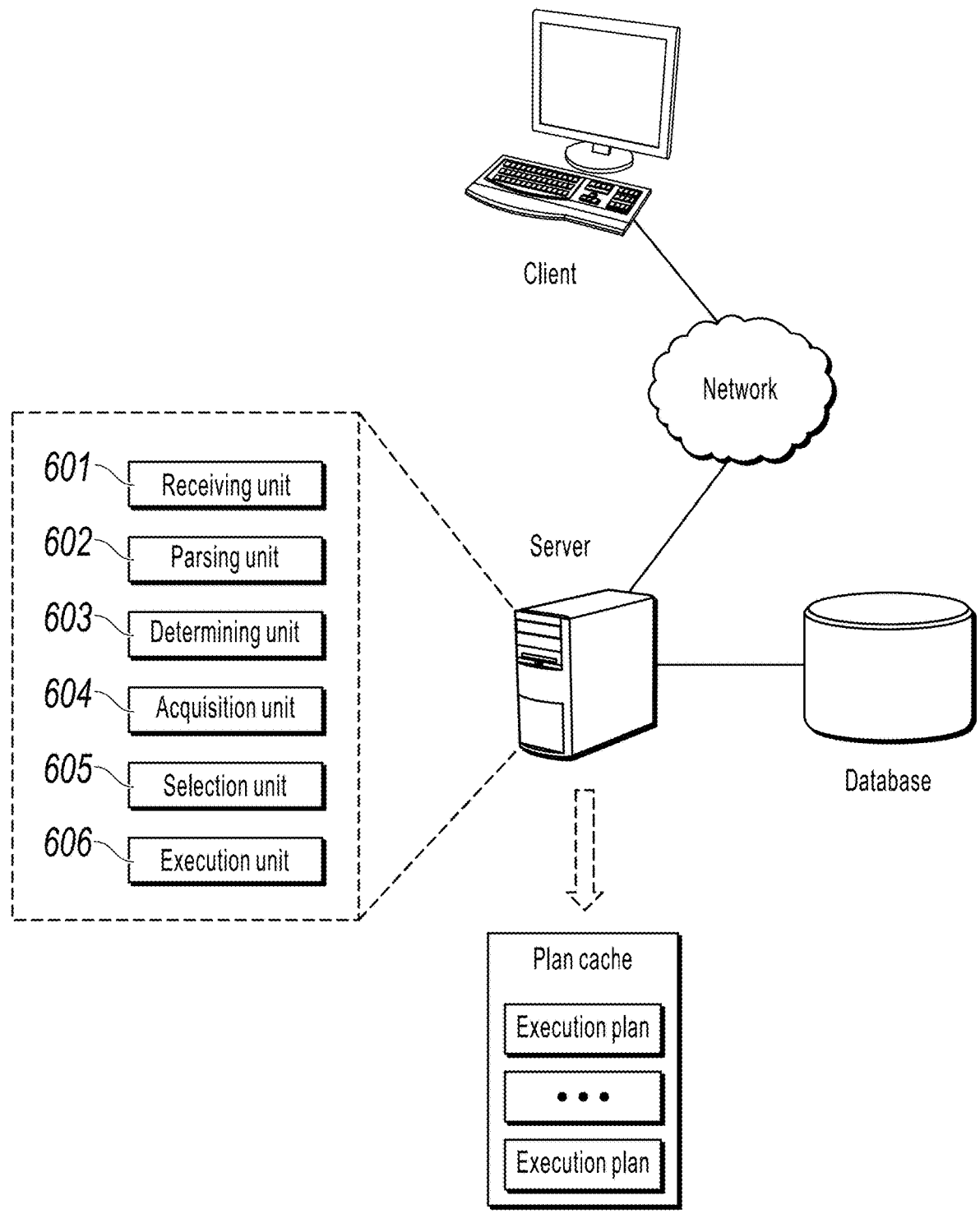
FIG. 6 is a schematic diagram illustrating a database access apparatus, according to an implementation of the present specification.

Corresponding to the previously described database access method, an implementation of the present specification further provides a database access apparatus. As shown in FIG. 6, the apparatus includes the following: a receiving unit 601, configured to receive a database access statement; a parsing unit 602, configured to parse the database access statement received by the receiving unit 601, to determine a target user parameter included in the database access statement; a determining unit 603, configured to determine a statement type of the database access statement; the determining unit 603 can be configured to: parameterize the database access statement; and determine the statement type based on the parameterized database access statement, where the parameterizing the database access statement can include the following: extracting a corresponding object set from the database access statement; for an object in the object set, determining an object type group that the object belongs to, and obtaining a corresponding group name; and replacing the object in the database access statement with the corresponding group name, and replacing the target user parameter with a wildcard; an acquisition unit 604, configured to obtain a pre-stored execution plan group corresponding to the database access statement of the statement type determined by the determining unit 603, where execution plans in the execution plan group are distinguished by using different user parameters; a selection unit 605, configured to select a target execution plan from the execution plan group obtained by the acquisition unit, based on the target user parameter; and an execution unit 606, configured to execute the target execution plan selected by the selection unit 605.

Optionally, the apparatus can further include a grouping unit 607 and an establishment unit 608.

The selection unit 605 is further configured to select multiple objects with the same object pattern from a database.

The grouping unit 607 is configured to group the multiple objects selected by the selection unit 605.

The execution unit 606 is further configured to repeat the previously described selection and grouping steps until all objects in the database are categorized into corresponding groups.

The establishment unit 608 is configured to use the multiple groups obtained by the grouping unit 607 as the multiple object type groups, and establish a mapping relationship between each object in the database and the multiple object type groups.

The determining unit 603 can be further configured to: determine the object type group that the object belongs to, based on the mapping relationship.

Optionally, the selection unit 605 can be configured to: for the object in the object set, determine whether an object pattern of the object is the same as an object pattern of each object in the object type group that the object belongs to; if the object patterns are the same, successively calculate a similarity between the object and each object; and when a similarity between the object and any object is less than a predetermined threshold, select the target execution plan from the execution plan group based on the target user parameter; or when no similarity between the object and each object is less than a predetermined threshold, re-determine an object type group that the object belongs to, and obtain a corresponding target execution plan based on the re-determined object type group.

Optionally, the apparatus can further include the following: a calculation unit 609, configured to: for each object in each object type group, periodically and successively calculate similarities between the object and other objects in the object type group; and the determining unit 603 is further configured to: when none of the similarities between the object and other objects is less than a predetermined threshold, re-determine an object type group that the object belongs to.

Optionally, the selection unit 605 can be further configured to: calculate an Euclidean distance between the target user parameter and a user parameter corresponding to each execution plan in the execution plan group; and when an Euclidean distance between the target user parameter and a user parameter corresponding to any execution plan is less than a distance threshold, use the any execution plan as the target execution plan.

Optionally, the apparatus can further include the following: a generation unit 6010, configured to generate a new execution plan based on the target user parameter; and an adding unit 6011, configured to add the new execution plan generated by the generation unit 6010 to the execution plan group, and execute the new execution plan.

The functions of the functional modules of the apparatus in the previous implementation of the present specification can be implemented by using the steps of the previous method implementation. Therefore, a specific working process of the apparatus provided in an implementation of the present specification is omitted here for simplicity.

In the database access apparatus provided in some implementations of the present specification, the receiving unit 601 is configured to receive a database access statement; the parsing unit 602 is configured to parse the database access statement to determine a target user parameter included in the database access statement; the determining unit 603 is configured to determine a statement type of the database access statement; the acquisition unit 604 is configured to obtain a pre-stored execution plan group corresponding to the database access statement of the determined statement type; the selection unit 605 is configured to select a target execution plan from the execution plan group based on the target user parameter; and the execution unit 606 is configured to execute the target execution plan. Thus, accuracy of the user's access to the database and access efficiency can be improved.

It is worthwhile to note that, the database access apparatus provided in the implementations of the present specification can be a module or a unit of the server in FIG. 1.

A person skilled in the art should be aware that in the previously described one or more examples, functions described in the present specification can be implemented by hardware, software, firmware, or any combination thereof. When being implemented by using software, these functions can be stored in a computer-readable medium or transmitted as one or more instructions or code in the computer-readable medium.

The objectives, technical solutions, and beneficial effects of the present specification are further described in detail in the previously described specific implementations. It should be understood that the previous descriptions are merely specific implementations of the present specification, but are not intended to limit the protection scope of the present specification. Any modification, equivalent replacement, or improvement made based on the technical solutions of the present specification shall fall within the protection scope of the present specification.

What is claimed is:

1. A computer-implemented database access method, comprising:
    receiving, by a server, a database access statement comprising a target identifying parameter and one or more objects;
    parsing the database access statement to determine the target identifying parameter;
    parameterizing the database access statement to obtain a parameterized database access statement, wherein parameterizing the database access statement comprises replacing at least one object of the one or more objects with an object group parameter;
    determining a statement type of the database access statement based on the parameterized database access statement;
    selecting, from a plurality of different pre-stored execution plan groups, a first pre-stored execution plan group corresponding to the statement type, wherein the first pre-stored execution plan group comprises a plurality of execution plans for accessing a database corresponding to the database access statement, each execution plan of the plurality of execution plans corresponding to a different respective identifying parameter, and wherein each different pre-stored execution plan group corresponds to a different respective statement type;
    selecting a target execution plan from the first pre-stored execution plan group based on the target identifying parameter; and
    executing the target execution plan.

2. The computer-implemented method of claim 1, wherein replacing the at least one object of the one or more objects with the object group parameter comprises:
    extracting the one or more objects from the database access statement;
    determining an object type group to which the at least one object of the one or more objects belongs; and
    replacing, in the database access statement, the at least one object with the object group parameter, wherein the object group parameter corresponds to the object type group to which the at least one object belongs.

3. The computer-implemented method of claim 1, wherein parameterizing the database access statement comprises replacing, in the database access statement, the target identifying parameter with a wildcard.

4. The computer-implemented method of claim 1, wherein selecting the target execution plan from the first pre-stored execution plan group based on the target identifying parameter comprises:
   calculating respective parameters distances between the target identifying parameter and one or more other identifying parameters, the one or more other identifying parameters corresponding respectively to one or more execution plans of the plurality of execution plans in the first pre-stored execution plan group; and
   selecting, as the target execution plan, an execution plan of the one or more execution plans that corresponds to a parameter distance that is less than a distance threshold.

5. The computer-implemented method of claim 1, wherein the one or more objects comprise a table of the database.

6. The computer-implemented method of claim 1, wherein the one or more objects are grouped into one or more object type groups based on respective table parameters of the one or more objects.

7. The computer-implemented method of claim 1, wherein the target identifying parameter comprises at least one of an integer, a floating-point number, or a string.

8. A non-transitory, computer-readable medium storing one or more instructions that, when executed by a computer system, cause the computer system to perform database access operations comprising:
   receiving a database access statement comprising a target identifying parameter and one or more objects;
   parsing the database access statement to determine the target identifying parameter;
   parameterizing the database access statement to obtain a parameterized database access statement, wherein parameterizing the database access statement comprises replacing at least one object of the one or more objects with an object group parameter;
   determining a statement type of the database access statement based on the parameterized database access statement;
   selecting, from a plurality of different pre-stored execution plan groups, a first pre-stored execution plan group corresponding to the statement type, wherein the first pre-stored execution plan group comprises a plurality of execution plans for accessing a database corresponding to the database access statement, each execution plan of the plurality of execution plans corresponding to a different respective identifying parameter, and wherein each different pre-stored execution plan group corresponds to a different respective statement type;
   selecting a target execution plan from the first pre-stored execution plan group based on the target identifying parameter; and
   executing the target execution plan.

9. The non-transitory, computer-readable medium of claim 8, wherein replacing the at least one object of the one or more objects with the object group parameter comprises:
   extracting the one or more objects from the database access statement;
   determining an object type group to which the at least one object of the one or more objects belongs; and
   replacing, in the database access statement, the at least one object with the object group parameter, wherein the object group parameter corresponds to the object type group to which the at least one object belongs.

10. The non-transitory, computer-readable medium of claim 8, wherein parameterizing the database access statement comprises replacing, in the database access statement, the target identifying parameter with a wildcard.

11. The non-transitory, computer-readable medium of claim 8, wherein selecting the target execution plan from the first pre-stored execution plan group based on the target identifying parameter comprises:
   calculating respective parameters distances between the target identifying parameter and one or more other identifying parameters, the one or more other identifying parameters corresponding respectively to one or more execution plans of the plurality of execution plans in the first pre-stored execution plan group; and
   selecting, as the target execution plan, an execution plan of the one or more execution plans that corresponds to a parameter distance that is less than a distance threshold.

12. The non-transitory, computer-readable medium of claim 8, wherein the one or more objects comprise a table of the database.

13. The non-transitory, computer-readable medium of claim 8, wherein the one or more objects are grouped into one or more object type groups based on respective table parameters of the one or more objects.

14. The non-transitory, computer-readable medium of claim 8, wherein the target identifying parameter comprises at least one of an integer, a floating-point number, or a string.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, cause the one or more computers to perform database access operations comprising:
   receiving a database access statement comprising a target identifying parameter and one or more objects;
   parsing the database access statement to determine the target identifying parameter;
   parameterizing the database access statement to obtain a parameterized database access statement, wherein parameterizing the database access statement comprises replacing at least one object of the one or more objects with an object group parameter;
   determining a statement type of the database access statement based on the parameterized database access statement;
   selecting, from a plurality of different pre-stored execution plan groups, a first pre-stored execution plan group corresponding to the statement type, wherein the first pre-stored execution plan group comprises a plurality of execution plans for accessing a database corresponding to the database access statement, each execution plan of the plurality of execution plans corresponding to a different respective identifying parameter, and wherein each different pre-stored execution plan group corresponds to a different respective statement type;
   selecting a target execution plan from the first pre-stored execution plan group based on the target identifying parameter; and
   executing the target execution plan.

16. The computer-implemented system of claim 15, wherein replacing the at least one object of the one or more objects with the object group parameter comprises:
- extracting the one or more objects from the database access statement;
- determining an object type group to which the at least one object of the one or more objects belongs; and
- replacing, in the database access statement, the at least one object with the object group parameter, wherein the object group parameter corresponds to the object type group to which the at least one object belongs.

17. The computer-implemented system of claim 15, wherein parameterizing the database access statement comprises replacing, in the database access statement, the target identifying parameter with a wildcard.

18. The computer-implemented system of claim 15, wherein selecting the target execution plan from the first pre-stored execution plan group based on the target identifying parameter comprises:
- calculating respective parameters distances between the target identifying parameter and one or more other identifying parameters, the one or more other identifying parameters corresponding respectively to one or more execution plans of the plurality of execution plans in the first pre-stored execution plan group; and
- selecting, as the target execution plan, an execution plan of the one or more execution plans that corresponds to a parameter distance that is less than a distance threshold.

19. The computer-implemented system of claim 15, wherein the one or more objects comprise a table of the database.

20. The computer-implemented system of claim 15, wherein the one or more objects are grouped into one or more object type groups based on respective table parameters of the one or more objects.

* * * * *